(12) United States Patent
Drake

(10) Patent No.: US 10,652,780 B2
(45) Date of Patent: May 12, 2020

(54) SYSTEMS AND METHODS FOR THE TEMPORAL SHIFTING OF DATA DOWNLOADS OR STREAMING

(71) Applicant: T-Mobile USA, Inc., Bellevue, WA (US)

(72) Inventor: Aaron Drake, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/117,850

(22) Filed: Aug. 30, 2018

(65) Prior Publication Data
US 2018/0376299 A1  Dec. 27, 2018

Related U.S. Application Data

(62) Division of application No. 14/972,982, filed on Dec. 17, 2015, now Pat. No. 10,104,514.

(51) Int. Cl.
*H04W 28/02* (2009.01)
*H04L 29/08* (2006.01)
(Continued)

(52) U.S. Cl.
CPC ......... *H04W 28/0289* (2013.01); *H04L 67/14* (2013.01); *H04L 67/325* (2013.01); *H04W 4/18* (2013.01); *H04W 24/02* (2013.01)

(58) Field of Classification Search
CPC ....... H04L 67/325; H04L 67/06; H04L 67/32; H04L 12/1489; H04L 12/1492;
(Continued)

(56) References Cited

U.S. PATENT DOCUMENTS 9,247,559 B2 * 1/2016 Devi ................ H04W 72/1226
9,900,231 B2 * 2/2018 Zalmanovitch ....... H04L 43/045
(Continued)

OTHER PUBLICATIONS

Office action for U.S. Appl. No. 14/972,982, dated Nov. 29, 2017, Drake, "Systems and Methods for The Temporal Shifting of Data Downloads or Streaming", 9 pages.
(Continued)

*Primary Examiner* — Nam T Huynh
(74) *Attorney, Agent, or Firm* — Lee & Hayes, P.C.

(57) ABSTRACT

Systems and methods for providing time-shifted data downloads over cellular networks are disclosed. The downloads can be selected using an application or other data consuming application with a "download later" feature, or similar. The application can register with a data shifting service (DSS) to receive a low-priority, or "0-rated," download of the data. The DSS can place the application in queue waiting for predetermined network conditions (e.g., network utilization to fall below a predetermined level). Upon occurrence of the predetermined network conditions (e.g., network utilization falling below a predetermined rate), the DSS can inform the application that a low-priority download window is available. The application can then download the data from a content provider. The DSS can enable cellular networks to increase average network utilization, while reducing peak demand. The system may offer low-priority downloads at reduced cost, or free, to incentivize use of the DSS.

20 Claims, 11 Drawing Sheets

(51) Int. Cl.
*H04W 24/02* (2009.01)
*H04W 4/18* (2009.01)

(58) Field of Classification Search
CPC ............. H04L 43/0876; H04L 43/0882; H04L 41/5022; H04L 43/16; H04L 47/12; H04L 47/122; H04L 47/22; H04L 47/2433; H04W 72/1247; H04W 72/1252; H04W 28/0231; H04W 28/0289; H04W 72/12; H04W 72/1257; H04W 72/1263; H04W 72/04; H04W 72/042; H04W 72/0486; H04W 72/1205; H04M 15/8083; H04M 15/58; H04M 15/60; H04M 15/8027
See application file for complete search history.

(56) References Cited

U.S. PATENT DOCUMENTS

| | | |
|---|---|---|
| 2008/0192820 A1 | 8/2008 | Brooks et al. |
| 2013/0031279 A1 | 1/2013 | Venugopal et al. |
| 2014/0192662 A1 | 7/2014 | Chetlur et al. |
| 2014/0347984 A1* | 11/2014 | Speks .................. H04W 28/16 370/230 |
| 2016/0269929 A1 | 9/2016 | Livanos et al. |
| 2016/0295448 A1* | 10/2016 | Cai ....................... H04W 72/12 |
| 2016/0316388 A1 | 10/2016 | Rosen et al. |
| 2017/0180960 A1 | 6/2017 | Drake |

OTHER PUBLICATIONS

Office action for U.S. Appl. No. 14/972,982, dated Feb. 8, 2017, Drake, "Systems and Methods for The Temporal Shifting of Data Downloads or Streaming", 8 pages.

Office action for U.S. Appl. No. 14/972,982, dated Aug. 7, 2017, Drake, "Systems and Methods for The Temporal Shifting of Data Downloads or Streaming", 9 pages.

* cited by examiner to

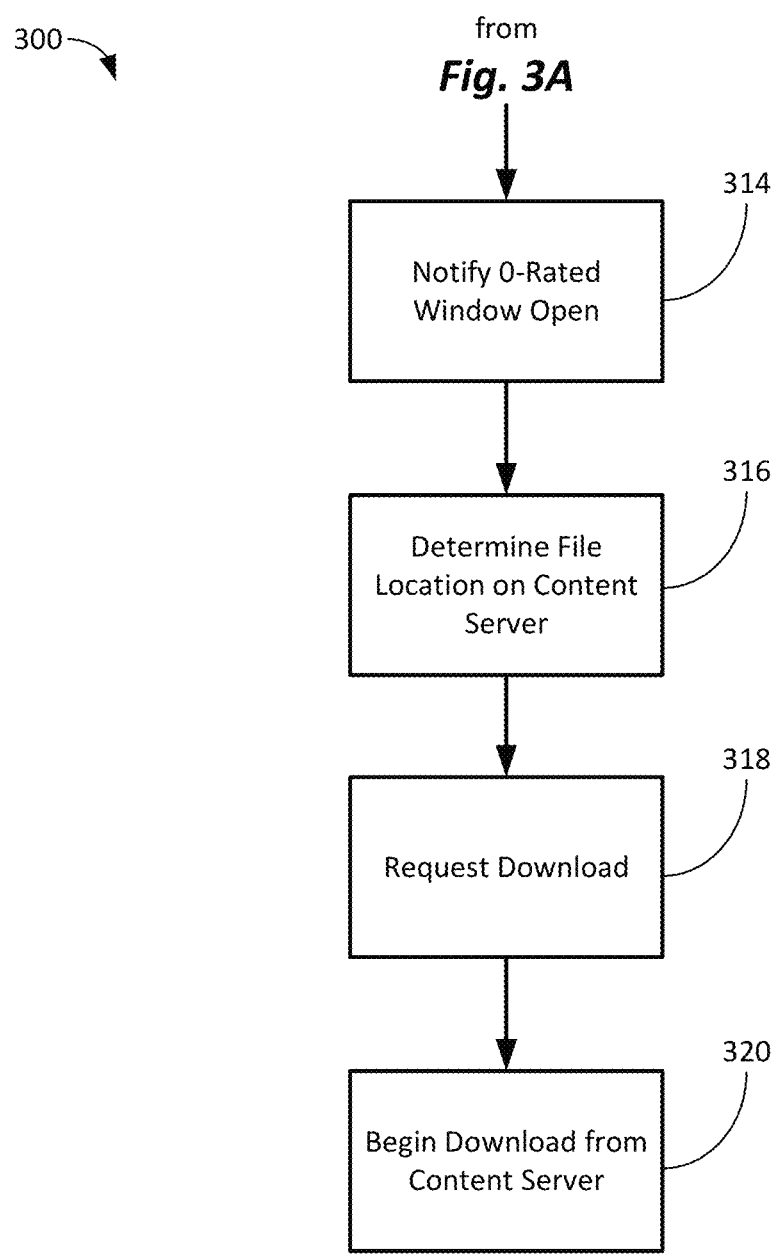

SYSTEMS AND METHODS FOR THE TEMPORAL SHIFTING OF DATA DOWNLOADS OR STREAMING

CROSS-REFERENCE TO RELATED APPLICATION

This application is a divisional of, and claims priority to, co-pending U.S. patent application Ser. No. 14/972,982, entitled "SYSTEMS AND METHODS FOR THE TEMPORAL SHIFTING OF DATA DOWNLOADS OR STREAMING", filed on Dec. 17, 2015, which is fully incorporated herein by reference.

BACKGROUND

Smartphones, tablets, laptops, and other internet enabled electronic equipment are ubiquitous in today's society. These devices may provide voice calling, e-mail access, internet access, and other services. Due to their mobility, many of these devices utilize cellular voice and data connections to provide these services. As a result, the capacity requirements for cellular networks have grown exponentially in recent years.

To meet demand, cellular networks are generally designed for the worst-case scenario. In the case of networks, this is based largely on the maximum predicted traffic flow (i.e., data usage) at any given time (e.g., TB/sec). In other words, networks must be designed to meet maximum usage—not average usage—to prevent failures such as dropped calls or download interruptions. As a result, cellular networks must often be oversized and thus, operate at less than full capacity much of the time. If maximum data usage occurs between 1 PM and 5 PM, for example, the network may operate at significantly less than 100% capacity for the majority of the day.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure can comprise a system for scheduling and downloading cellular data at times of low network utilization. The system can include a user interface with a "watch later," "listen later," or similar feature to enable a user to choose to download and consume content (e.g., music, video, games, or applications) in the future. The system can then schedule data files, or parts of data files, to be downloaded at times when network usage is below a predetermined level. In some examples, the system can also divide or fragment files into smaller parts, download the parts discretely, and then recombine the downloaded parts into the original file.

As mentioned above, due to the need to meet the capacity requirements in times of maximum demand, cellular networks, and indeed most networks, are generally oversized when compared to the sized needed to handle average traffic levels. As a result, in "off-peak" times, or times of lower usage, these networks are often utilized at significantly less than 100% of network capacity. Building a network with a larger data transfer capacity, however, costs more money than building a comparatively smaller network. Making better use of existing network infrastructure to bring utilization of that a network nearer to 100% (e.g., 95%), on the other hand, costs nothing (or nearly nothing).

As discussed herein, the terms "network utilization" and "network utilization rate" can refer to a number of things. In some case, these terms can refer to the utilization rate of a single cell tower. In other case, the terms can refer to the network utilization rate of a portion, or all, of the cellular network. Thus, network utilization can refer to local, state, regional, or national utilization rates. In reality, each network, or portion of a network, has specific "bottlenecks" that limit the flow of information. In cellular networks, the bottleneck is often the individual cell towers. Regardless, the system described herein can be applied at any level, by simply providing the desired utilization rate to the system.

Figure 1:
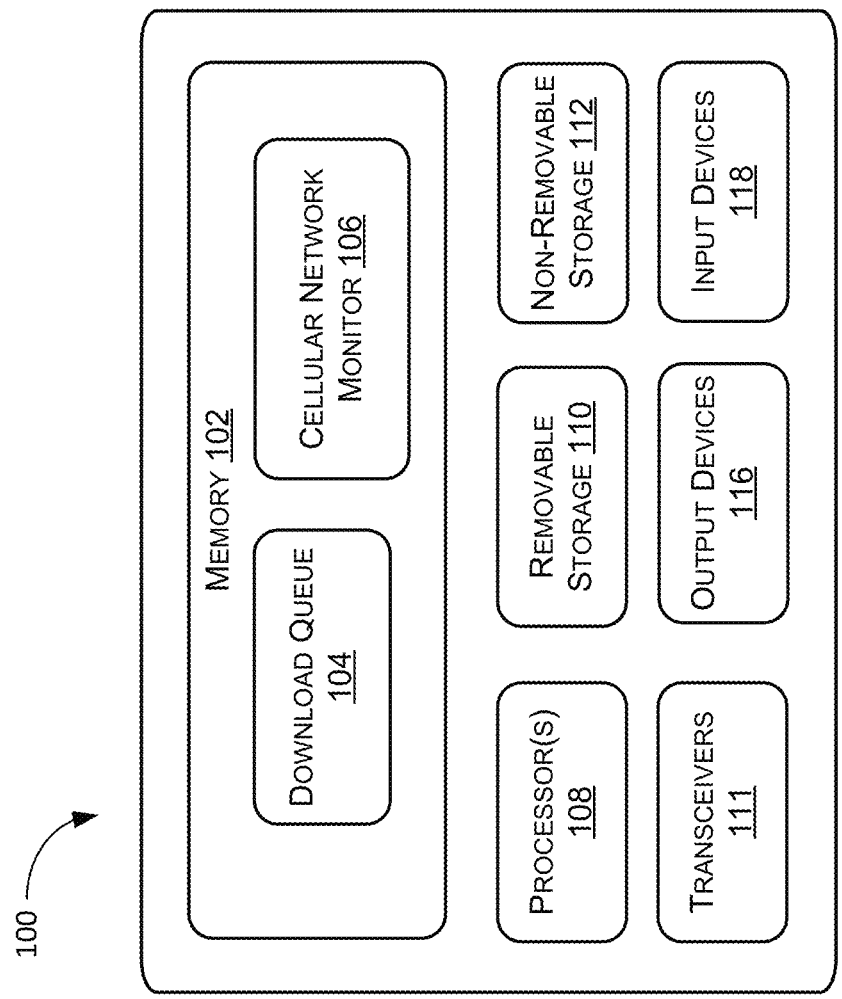
FIG. 1 illustrates a component level view of a data shifting service (DSS) configured to receive and manage requests for 0-rated downloads, in accordance with some examples of the present disclosure.

FIG. 1 illustrates a component level view of a data shifting service (DSS) module or computer. As discussed below, the DSS 100 is configured to receive and manage requests for 0-rated downloads from various users and/or applications, including third-party applications. As illustrated, the DSS 100 comprises a system memory 102 storing at least a 0-rated download queue 104 and a cellular network monitor 106. Also, the DSS 100 includes processor(s) 108, a removable storage 110, a non-removable storage 112, transceivers 114, output device(s) 116, and input device(s) 118. The DSS 100 may additionally contain a policy engine to receive, create, transmit and manage 0-rated policy rules.

In various implementations, system memory 102 is volatile (such as RAM), non-volatile (such as ROM, flash memory, etc.) or some combination of the two. The download queue 104 may include a list of downloads awaiting a 0-rated download slot, records for subscribers of the telecommunication network, user devices, or for combinations of subscribers and user devices, and information related to content providers. The records may also include any or all of a plan limit on data consumption (e.g., 2 GB per month), a current content consumption metric (e.g., 1 GB for current month), and a service quality of content being consumed by the user of the user device, and a user-selected quality setting, among other things. The cellular network monitor 106 may receive the status of various network parameters including, for example, total current network data usage, current percentage of maximum data usage, download speeds, reliability metrics, and total number of current users.

In some implementations, the processor(s) 108 is a central processing unit (CPU), a graphics processing unit (GPU), or both CPU and GPU, or any other sort of processing unit.

The DSS 100 may also include additional data storage devices (removable and/or non-removable) such as, for example, magnetic disks, optical disks, or tape. Such additional storage is illustrated in FIG. 1 by removable storage 110 and non-removable storage 112.

Non-transitory computer-readable media may include volatile and nonvolatile, removable and non-removable tangible, physical media implemented in technology for storage of information, such as computer readable instructions, data structures, program modules, or other data. System memory 102, removable storage 110 and non-removable storage 112 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the DSS 100. Any such non-transitory computer-readable media may be part of the DSS 100.

In some implementations, the transceivers 114 include any sort of transceivers known in the art. For example, the transceivers 114 may include wired communication components, such as an Ethernet port, for communicating with other networked devices. Also or instead, the transceivers 114 may include wireless modem(s) to may facilitate wireless connectivity with other computing devices. Further, the transceivers 114 may include a radio transceiver that performs the function of transmitting and receiving radio frequency communications via an antenna (e.g., WiFi or Bluetooth®).

In some implementations, the output devices 116 include any sort of output devices known in the art, such as a display (e.g., a liquid crystal display), speakers, a vibrating mechanism, or a tactile feedback mechanism. Output devices 116 also include ports for one or more peripheral devices, such as headphones, peripheral speakers, or a peripheral display.

In various implementations, input devices 118 include any sort of input devices known in the art. For example, input devices 118 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), a touchscreen, or one or more other types of keys or buttons, and may also include a joystick, wheel, and/or designated navigation buttons, or the like.

Figure 2A:
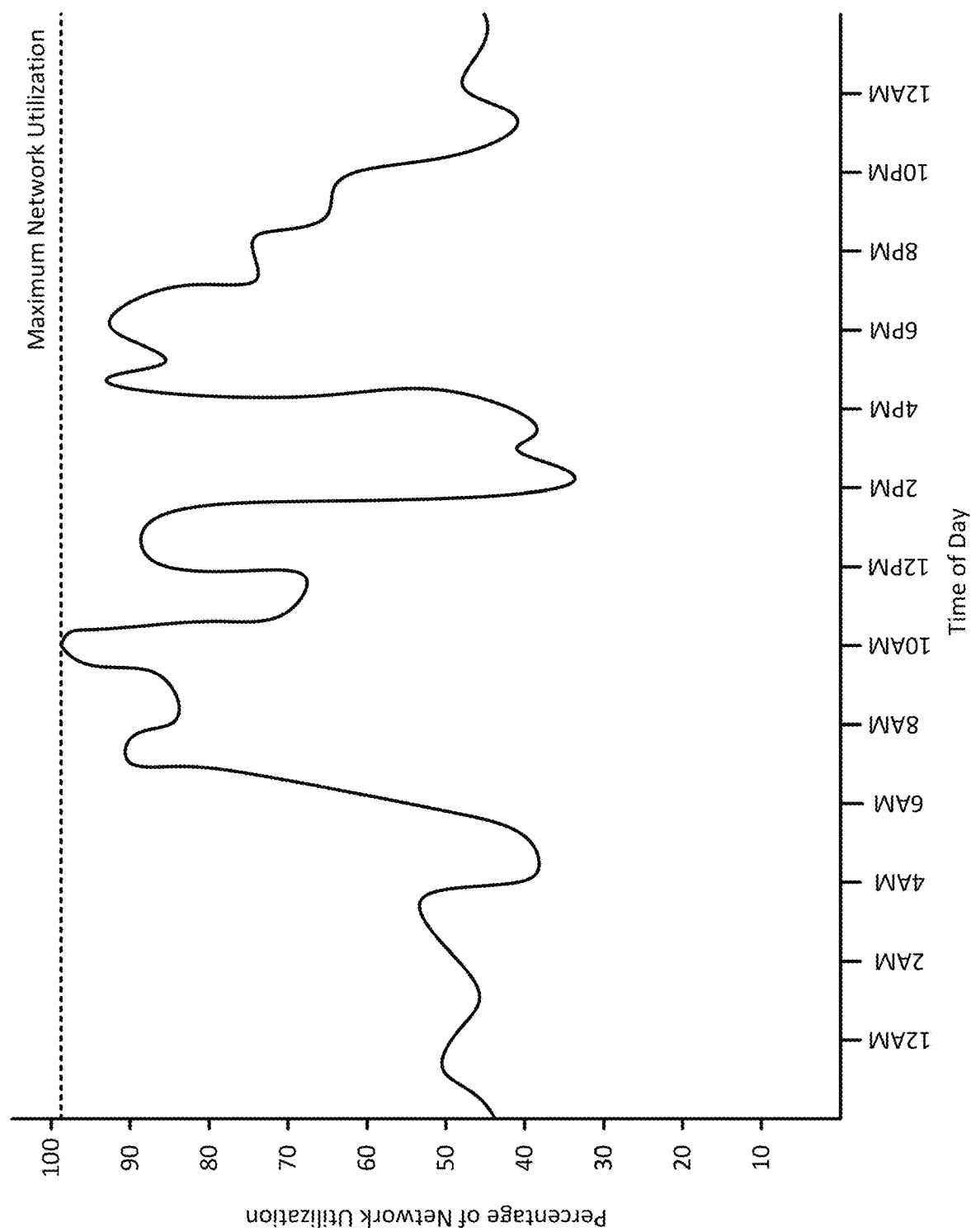
FIG. 2A is a graph depicting normal variances in cellular network utilization.

As shown in FIG. 2A, network traffic is generally cyclical with peaks and valleys. Cellular data usage may be relatively small during the overnight hours (e.g., 10 PM-6 AM), for example, when many people are sleeping. During the day, on the other hand, traffic may increase from 7 AM-10 AM and 4 PM-7 PM when people are commuting and many have only cellular data access. Similarly, traffic may be comparatively low from 10 AM-12 PM and 1 PM-4 PM, for example, when most people are working, and thus not accessing the internet via a cellular device (e.g., because they have wired internet access at their place of work). Data usage may peak, on the other hand, from 12 PM-1 PM when people are out of the office for lunch and checking e-mails or social media via their cellular devices. As shown by the dotted line in FIG. 2A, overall network capacity must be higher because peak usage is near 100%.

Figure 2B:
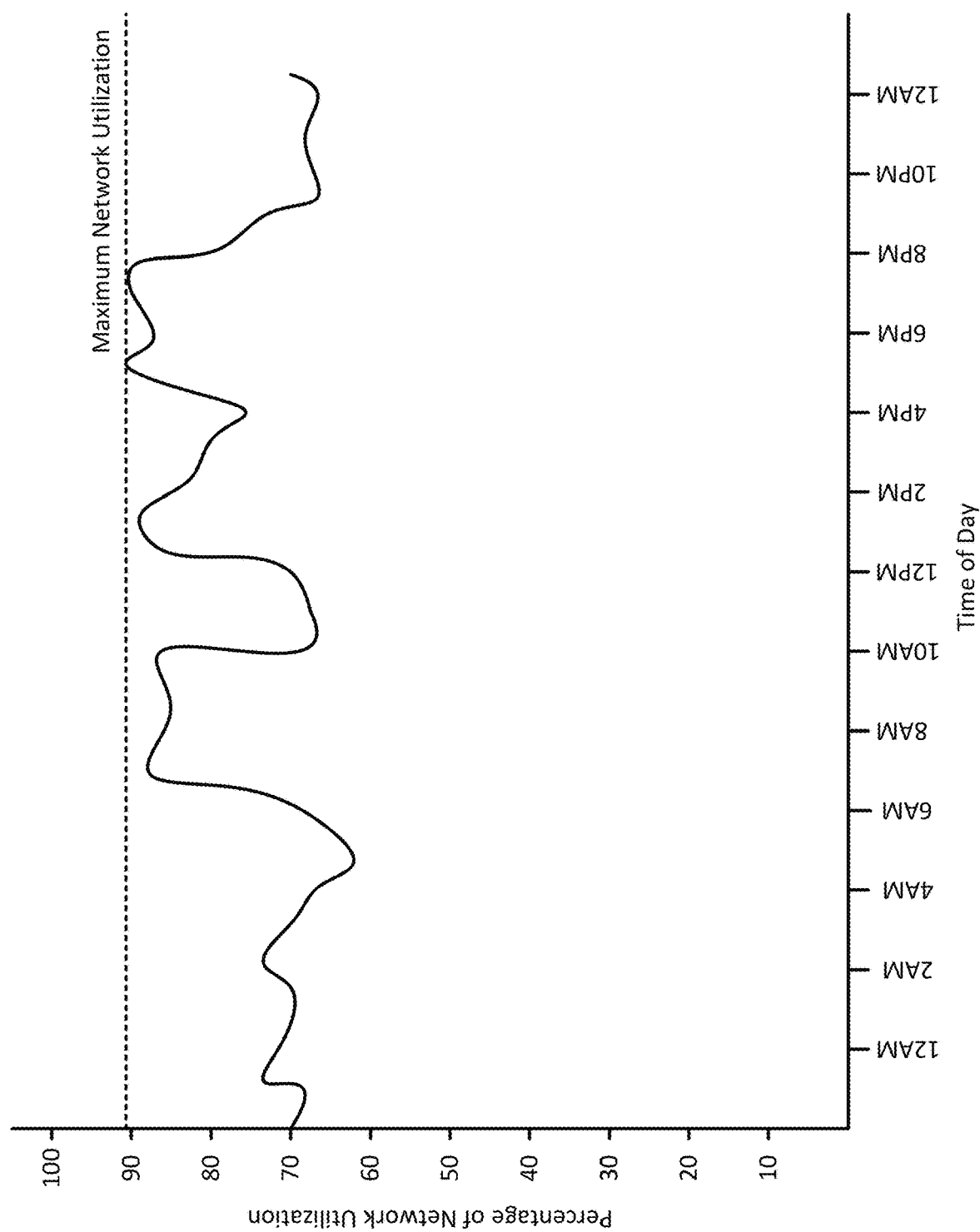
FIG. 2B is a graph depicting reduced variances in cellular network utilization by using time-shifted data downloads, in accordance with some examples of the present disclosure.

As shown in FIG. 2B, it would be advantageous to be able to smooth some of the peaks and valleys by moving some usage at peak times to off-peak times. Rather than downloading a movie during the day, for example, it would be advantageous to download the movie overnight when network usage is otherwise low. This can enable the overall network size to be smaller because peak usage is reduced, which reduces capital investment in infrastructure. In addition, network reliability may be improved by moving peak usage somewhat away from the maximum capacity of the network (i.e., error rates increase as the network nears 100% utilization).

To this end, examples of the present disclosure relate to systems and methods for shifting a portion of the so-called "peak" usage to off-peak times. This can enable the peaks and valleys associated with network utilization to be smoothed, increasing the average rate of network utilization, but reducing the difference between peak and off-peak network utilization, for example. The system can include the ability to schedule and download data based on set times or network utilization falling below a predetermined level (e.g., below 80% utilization).

It can be desirable, for example, to maintain a safety margin in network utilization to maintain high network reliability. In some examples, a 15% safety margin can be used. So, for example, when network utilization is below 80%, zero-rated downloads can be scheduled at will. When network utilization exceeds 80%, for example, network utilization can be monitored and controlled more closely to prevent over commitment and network reliability issues. An exemplary global policy for 0-rated downloads is shown in Table 1:

| Network Utilization | Policy |
| --- | --- |
| ≤80% | Schedule 0-rated downloads |
| 80-85% | Existing 0-rated downloads continue |
|  | No new 0-rate Downloads scheduled |
| >85% | Terminate existing 0-rated downloads |
|  | No new 0-rate downloads scheduled |

In some examples, these values can also be staggered to allow for multiple priority downloads. In other words, higher priority downloads can be scheduled and allowed to complete at respectively higher network utilization rates. In some examples, higher priority downloads can be staggered 5-10% above 0-rated downloads.

Figures 3A, 3B:
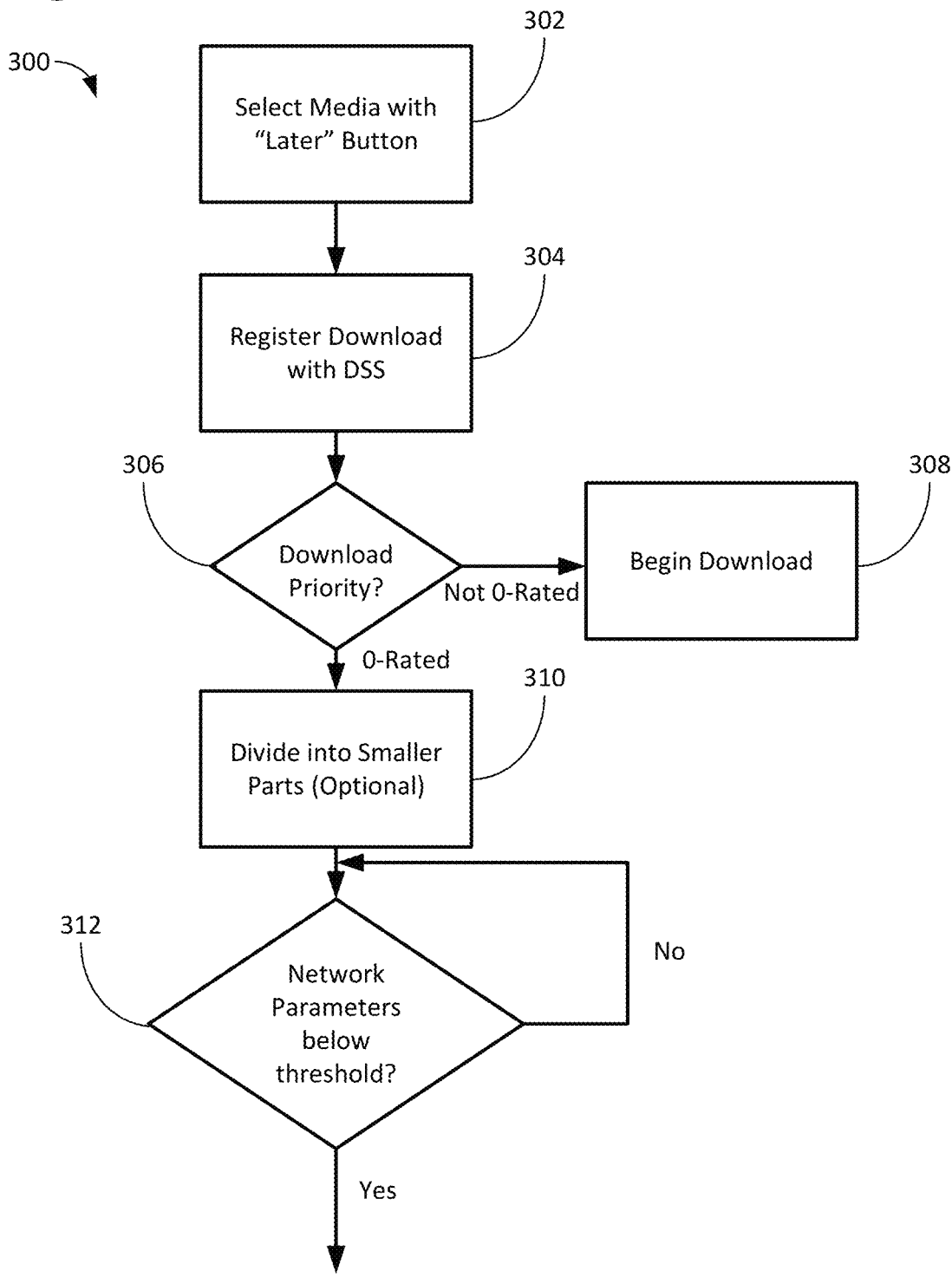
FIGS. 3A and 3B are flowcharts depicting a method to time-shift data downloads, in accordance with some examples of the present disclosure.

As shown in FIGS. 3A-3B, therefore, examples of the present disclosure can comprise a method 300 for shifting downloads temporally to enable downloads to be performed during times of relatively low network utilization. At 302, the user selects media (e.g., video, music, or application downloads) using the "_____ Later" button in a media application (e.g., an application provided by the provider or a third-party). The application can comprise, for example, a music application, video application, or software download application and can be provided by the cellular provider or a third-party provider. As mentioned above, the "_____ Later" button can vary based on the application in which it is being used. If, for example, the application is a video application, for example, the button may read "Watch Later." Similarly, when used in an app store or to update or download software, it may read "Download Later" or "Update Later." If used for a music application, on the other hand, it may read "Listen Later." In some cases the "_____ Later" button could simply be depicted in a graphical or iconographic format and not provide a text label related to its function.

At 304, the application can send a request to a data shifting service (DSS) to register the download. The DSS can provide download registration, download queuing, and network monitoring services, among other things. At 306, the DSS can determine the priority of the download. In most cases, as the button implies, the priority will be low and the DSS can schedule a "0-rated" download. In other words, the download is given the lowest priority on the network and is only downloaded when, and if, network utilization falls below a predetermined threshold (e.g., 80%, 85%, or 90%), as set by network administrators.

In other embodiments, the application may give the user an option to download the data later, but with a higher priority. If a user wishes to update a program before using it, for example, the user can set a high priority for that particular download. If a user wishes to download a movie, on the other hand, but does not care when he watches it, then the priority can be set to 0.

In some examples, different download priorities can be provided to different download windows based on different network parameters. In other words, downloads can be set to, for example, 0-dowload priority (low), 1-download priority (medium) and 2-download priority (high). In this manner, downloads can be charged at different rates with low priority downloads provided free (or at reduced cost) and medium and high priority downloads at respectively increasing cost to the user. In some examples, each priority level may also begin based on different levels of network utilization. In other words, low priority download windows do not open until network utilization falls to a relatively low level (e.g., 80%), while medium and high priority downloads can begin even though network utilization remains high (e.g., 90% and 95%, respectively). Thus, low priority downloads may take longer to begin than higher priority downloads.

To provide an incentive to use 0-rated downloads, therefore, 0-rated downloads can be offered to users outside the confines of the user's monthly data limits. In other words, 0-rated downloads do not count towards the user's monthly data plan. In this manner, if a user wishes to assign a higher priority to a download (to ensure it happens soon or immediately), this data may be counted against monthly plan limits or charged separately at a predetermined fee, while 0-rated downloads are essentially "free." At 308, in some examples, if the user wishes to download at a higher priority, or immediately, the download can be performed using normal methods outside the scope of the DSS.

At 310, for a 0-rate download, if necessary, the DSS can divide the download into smaller parts. If the user wishes to download a 4 GB movie, for example, the DSS can divide the download into eight 500 MB parts. This can enable 0-rated downloads to be "fit" into relative small downturns in network utilization. Of course, this may be unnecessary for files smaller than a predetermined size (e.g., 100 MB, 500 MB, 1 GB, etc.). The predetermined size may vary over time based on connection quality, connection speed, and system utilization rates, among other things. In other words, low system utilization rates, for example, can result in larger parts being downloaded together and vice-versa. Similarly, good connection quality can result in larger parts being downloaded together and vice-versa. Utilizing this methodology allows network administrators to make better use of the naturally intermittent bandwidth availability of modern mobile networks.

At 312, the DSS can determine whether 0-rated downloading is available based on the current status of the network. The DSS can determine, for example, that network utilization has fallen below a predetermined threshold and schedule a 0-rated download to fill the "trough" in utilization. At 314, when network utilization has fallen below the predetermined level, the DSS can send a message to the application that a 0-rated download window is available. In some cases, the window may be time-based (download as much as you can during the next five minutes), size based (download 500 MB and then stop), both (download for 5 min. or 500 MB, whichever comes first), event based (e.g., download commences when entering a new cell sector), billing or policy updates (e.g., download when a pre-paid account has new funds added or an account has a new feature added), or administratively based (e.g., download when a customer service representative or other party manually authorizes).

At 316, the application can determine the location of the file to be downloaded. In some cases, the file location may be static on a third-party content server (e.g., iTunes, Hulu, Google Play, etc.). In this case, the file location may be known from the initial selection of the file by the user and can simply be confirmed. In other cases, the file location may be dynamic and can be located on the server (or servers) when the 0-rated download is authorized.

At 318, the application can request the 0-rated download, either from the DSS, which can provide a policy and charging rule (PCC) to the policy charging and rules function/packet data network gateway (PCRF/P-GW), directly from the PCRF/P-GW, or directly from the content server. Upon installation of the PCC and registration of the download, at 320, the application can begin the download from the third-party content server. As discussed in detail below, the exchange of PCC rules, data, and other information can be done in a number of ways. As also discussed below, rules can be provided for downloads that fail to complete for a variety of reasons (e.g., a UE disconnecting from the cellular network).

Figure 4:
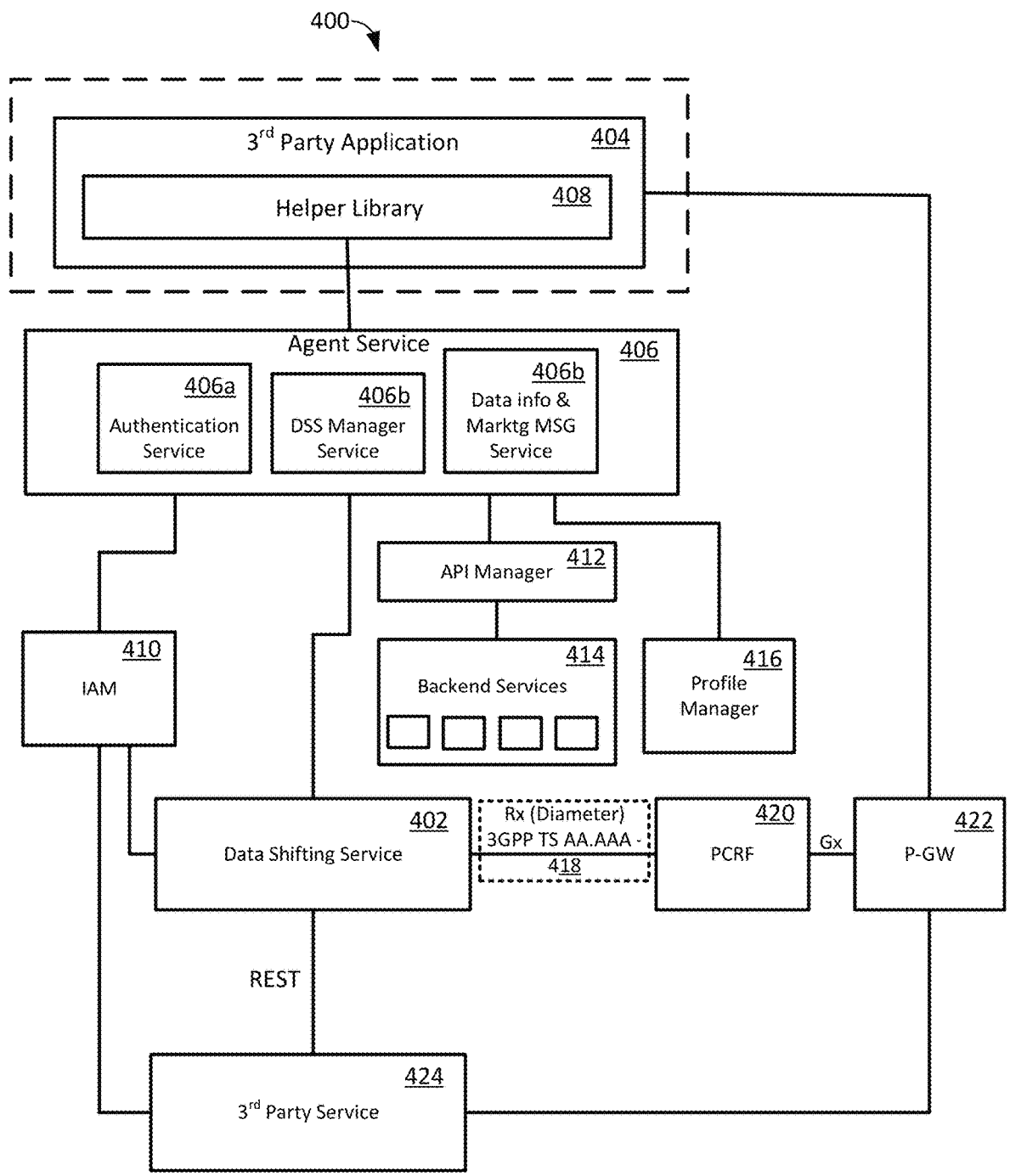
FIG. 4 depicts a system to provide time-shifted downloads, in accordance with some examples of the present disclosure.

As shown in FIG. 4, the system 400 can be integrated with existing cellular network components to provide additional functionality. In some examples, the DSS 402 can be utilized via an application 404. The application 404 can include, for example, a media player, app, or internet browser. The application 404 can incorporate a button, or other means, to access, for example, a "watch later," "listen later," or "download later" function.

This can enable the user to access the DSS 402 without adding an addition app to their mobile device, for example, and using an existing, familiar GUI, among other things. In other examples, the DSS 402 can be a separate application with a GUI that enables users to search and select content from content providers. In still other examples, the DSS 402 can be included in the application as an add-on or plug-in to provide, for example, a separate DSS console.

In some examples, the system 400 can also include an agent service 406. The agent service 406 can provide an application programming interface (API) for a helper library 408 for use by the application 404, discussed below. In some examples, the agent service 406 can be an internal API that is not generally intended for third-party developers to access directly. In this configuration, third-party developers can access the API via the helper library 408. In other examples, an open source API can be used, enabling third-party developers access and development privileges.

In some examples, the agent service 406 can include an authentication service 406a, which can provide a number of identification and access manager (IAM) type features. The authentication service 406a can detect, for example, whether the user is currently signed in. The authentication service 406a can also obtain an access token for the desired scope and execute a profile query using the access token, among other things. In some examples, the authentication service 406a can access and/or liaise between an existing IAM 410. The agent service 406 can also comprise a DSS manager service 406b to provide management and communication between the application 404 and the DSS 402.

In some examples, in addition to IAM functionality, the authentication service 406a can also provide user account status information to the application 404 including, for example, the mobile subscriber integrated services digital network number (MSISDN). The MSISDN can include, for example, the current phone number associated with the SIM, the status of the customer account (e.g., active, over quota, disabled, or roaming), and the type of customer account (e.g., pay-as-you-go or recurring). In some examples, the agent service 406 can also provide, for example, the next reset time of the user's plan, whether the user's plan is shared or not, the total amount of the data bucket in bytes, the remaining amount of data bucket in bytes, and whether the user is throttled or not.

In some examples, the agent service 406 can also include a data information and marketing messaging service module 406c, which can provide marketing messages via the application 404. In some examples, the data information and marketing messaging service module 406c can provide information to the application 404 about whether the user's account or user equipment (UE) has the ability to display a graphical user interface element that is filled by calling a marketing platform based on an event or context passed by the application. In some examples, the context can comprise a customer billing event, a UE entering or exiting a particular area (e.g., crossing a particular latitude and/or longitude), or other context sensitive event.

In some examples, the application 404 can also include the helper library 408. The helper library 408 can provide developer-friendly application program interfaces (APIs) for application developers who write code for the applications 404 (third-party, or otherwise). This can enable the third party application to use the agent service 406 features discussed above (e.g., IAM, user account information, etc.). In some examples, the helper library 408 can be deployed as a static library, such that it is compiled within the application 404. In this configuration, each application can contain a copy of the helper library 408 inside the application binary. In some examples, the helper library 408 can be deployed as a dynamic library that can be used during the execution of the application's 404 binary code. In the case of some modern interpreted languages, for example, the library 408 can be deployed as a compilation and linking artifact or existing in an intermediate machine readable code.

In general, the helper library 408 contains user-visible items and hence, is shipped as a library project. In this configuration, elements of helper library 408 can be merged with application 404 resources. In some examples, the helper library 408 can detect the existence of the agent service 406. If the agent service 406 is not detected, the user can be redirected to another resource (e.g., an app store such as Google Play or iTunes) for downloads. In some examples, the redirected resource can be a partner of the cellular provider to drive traffic to that site.

In some examples, the helper library 408 binds to the agent service 406 to implement the actual business logic. As a result, the helper library 408 can provide several IAM type APIs including, for example, checking and installing or updating the device agent as needed, determining which user is logged in (if any), obtaining an access token for the desired scope, and executing a profile query using the access token. In some examples, the helper library 408 can also provide APIs that, for example, provide users account status information and the ability to display an overlay that is filled by calling a marketing platform (e.g., Medio/Nokia) based on a context passed by the application.

In some examples, the agent service 406 can provide IAM function using an existing network IAM 410. As the name implies, the IAM 410 can identify the user and provide rules regarding the amount and privileges of access to which the user is entitled. Access to pay services, for example, may be restricted by a user's account (e.g., parental controls) or by a user's status (e.g., pay-as-you-go vs. recurring). In this manner, if a user requests a delayed video download, for example, but is not authorized to download video, the system can forgo sending the request to the DSS 402 and/or provide the user with an error message. In some examples, the IAM 410 can work in conjunction with the authentication service 406a to provide IAM functionality.

The system 400 can also include an API manager 412. The API manager 412 can modify, maintain, update, publish, and oversee the APIs used in the helper library 408 of the application 404. The API manager 412 may also provide end-user support resources (e.g., help files and manuals) and provide additional documentation for the APIs.

In some examples, the system 400 can also include various back end services 414. Back end services 414 can include, for example, statistics related to the number of users in a given time for the application 404, latency, and response times. Back end services 414 can also include network data including, for example, utilization rates, download and upload speeds, and network down time.

In some examples, the system 400 can also include a profile manager 416. The profile manager 416 can maintain a user's online profile including, for example, user application preferences and settings, e-mail addresses, logons, and passwords. In some examples, the profile manager 416 can provide synchronization services to enable e-mail applications, browser settings and history, and other features to be synchronized between multiple internet enabled devices and/or connections. The profile manager 416 may also provide synchronization between various apps that require personal information or other data for convenience to the user.

The DSS 402 can obtain authentication in the cellular network in the conventional manner via a third generation partnership project (3GPP) Authentication, Authorization, and Accounting (AAA) server 418. As then name implies, the 4GPP AAA server 418 can authenticate and authorize downloads for the DSS 402 over the cellular network. The 4GPP AAA server 418 can also set policy control for the DSS 402 including setting download priority and download speeds and size, among other things. The 4GPP AAA server 418 can also handle accounting for any charges related to downloads, applications, or network access (e.g., for pay-as-you-go customers or for higher priority downloads).

The DSS 402 can access network resources in the usual manner, via a policy and charging rules function (PCRF) software module 420. The PCRF 420 can make policy decisions for each user based on their subscription, quality of service (QoS) rules, and charging rules, among other things. The PCRF 420 can allocate network resources for the network to establish downloads and allocate the requested bandwidth for the download with the network. The PCRF 420 can also enable downloads to be assigned different priorities by, for example, charging users a premium for prioritized downloads, for example, yet providing 0-rated downloads at no charge. Finally, the DSS 402 can be connected to one or more packet data networks (PDNs) via the packet data network gateway (P-GW) 422. The PG-W 422 can be used in the convention manner to provide connectivity from the UE to external PDNs by acting as the controller of traffic for the UE. The PG-W 422 can manage policy enforcement, packet filtration for users, charging support, and lawful interception, among other things.

In some examples, the system 400 can also include one or more third party services 424. The third party service 424 can comprise one or more content service providers. In some examples, the third party service 424 can comprise a system created by content publishers to store and distribute licensed content to end users. In some examples, the third party application 404 can communicate with the data shift service 402 via one of the aforementioned methods to identify the third party service 424 to enable the third party application 404 to download content from the third party service 424 during a zero rated window.

Figure 5:
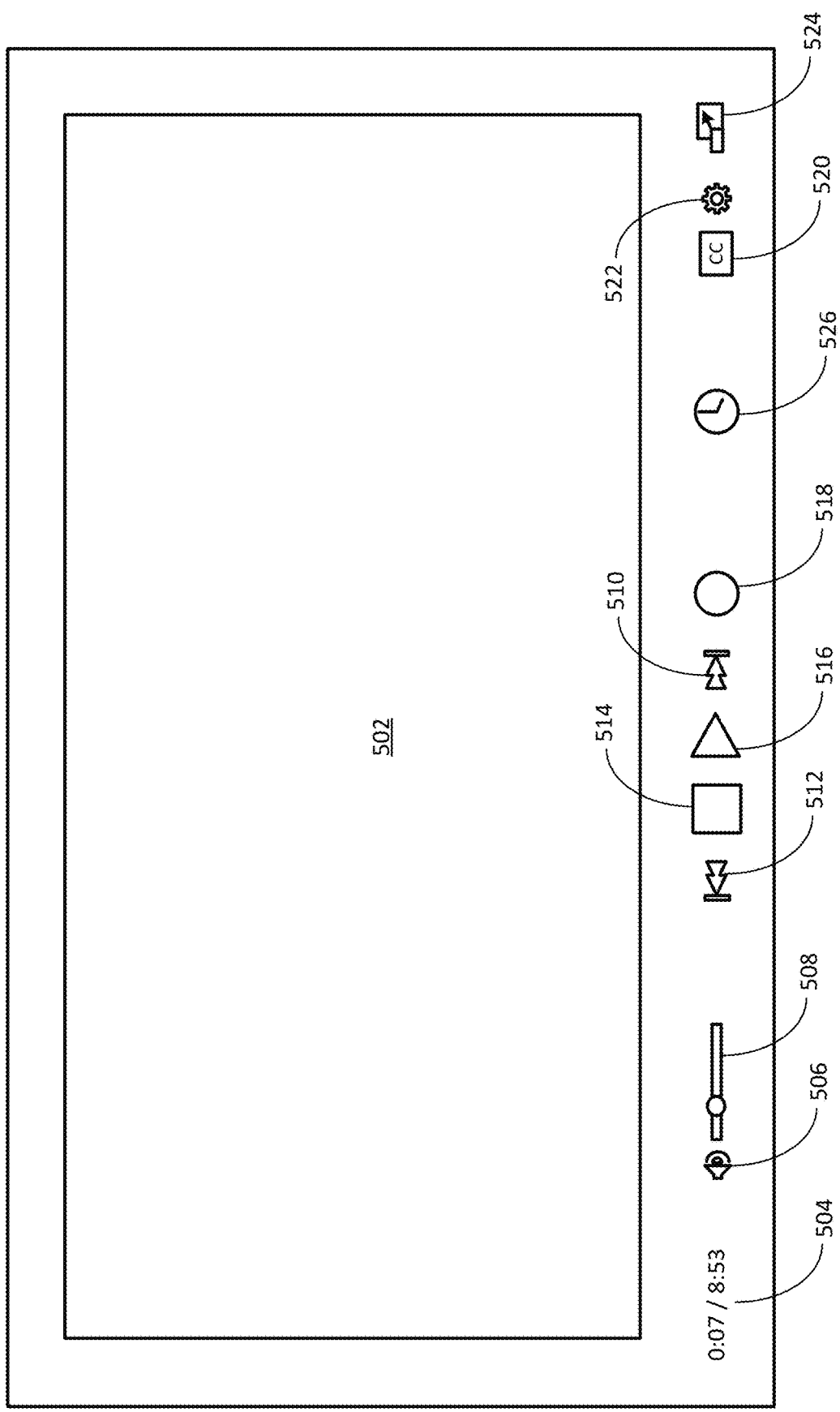
FIG. 5 depicts a graphical user interface (GUI) including a time-shift button, in accordance with some examples of the present disclosure.

As shown in FIG. 5, in some examples, the system can include a graphical user interface (GUI) 500 for videos or music, for example. The GUI 500 can include standard features such as, for example, a main display screen 502, time played/time remaining counter 504, mute button 506, volume slider 508, fast-forward 510 and rewind 512 buttons, stop 514 and play 516 buttons, and a record button 518. The GUI 500 can also include, for example, a closed captioning button 520, settings button 522, and a full screen button 524.

In addition to these conventional controls, however, the GUI 500 can also include a "watch later" button 526. This can enable the user to locate a video on an internet media site, for example, and—instead of downloading and watching it immediately—schedule it for a later download during off-peak hours or times of lower network utilization. This may be useful, for example, when the user wants to watch a particular video, but does not necessarily care when they watch it. Of course, while described above for use with online videos, the system can also be used for downloading music, games, data files, applications ("apps"), and other internet accessible data.

In other examples, rather than including a complete GUI 500, the watch later button 526 can be included separately in an existing third-party application, such as a video player or internet browser. In other words, the watch later button 526 can simply be an "add-on," or "plugin," to an existing application to provide additional functionality. In still other embodiments, third-party apps can include some customized form of the watch later button 526 (e.g., to conform to the aesthetics of an existing app), which then links the third-party app to the DSS.

Figure 6:
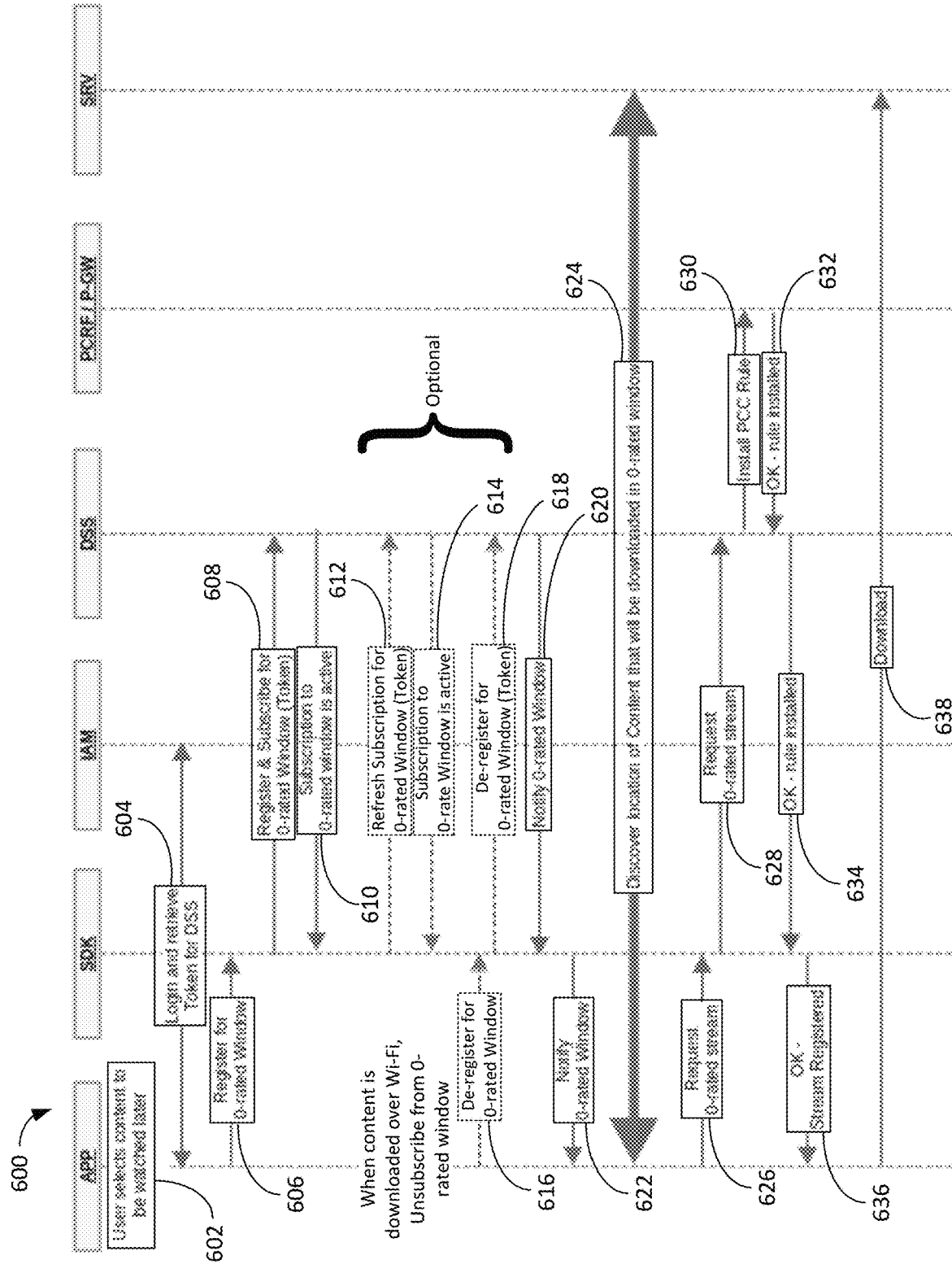
FIG. 6 is a system diagram depicting data flow in a cellular network in which the client resident on the device is responsible for defining and registering the 0-rated window policy to be utilized by the data shifting service (DSS), in accordance with some examples of the present disclosure.
Figure 7:
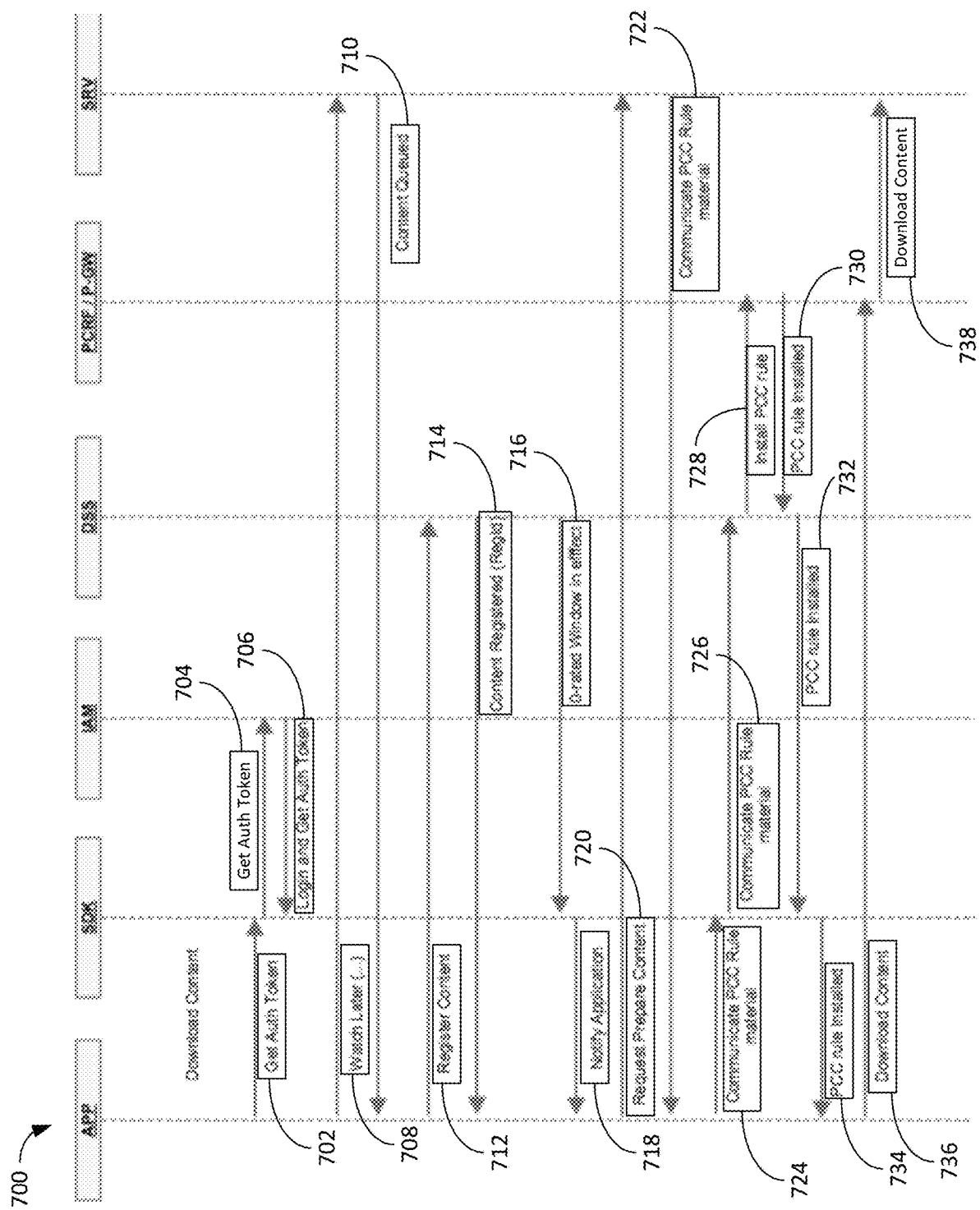
FIG. 7 is a system diagram depicting data flow in a cellular network in which the controlling server is responsible for defining the 0-rated window policy to be utilized by the data shifting service (DSS), which is then transmitted to the device to be registered in accordance with some examples of the present disclosure.

FIGS. 6-8 are functional flows showing several possible methods for scheduling and downloading 0-rated downloads using the DSS. In FIGS. 6-8, "APP" refers to an application using the DSS. This can be, for example, a video or music app, software download or update site, or other content provider and can be provided by the cellular provider or a third-party. "SDK" refers to the aforementioned agent service 406 which may or may not include the optional helper library 408 and "IAM" refers to the aforementioned identification and access manager 410. "PCRF/P-GW refers to the previously discussed policy charging rules function (PCRF) and packet data network gateway (P-GW) and "SRV" refers to a third-party content provider server on which the file to be downloaded is located. The SRV can be any number of content provider servers and content providers such as, for example, Google Play, iTunes, Amazon Marketplace, software providers, app stores, or other sources. Also, the term "download" is used below but is meant to encompass the download of any type of data file (e.g., videos, music, apps, software, etc.). As discussed below, the term "download" can also encompass downloading a portion or fragment of a data file, as applicable. In other words, as mentioned above, if a 5 GB download is divided into 500 MB parts for download, each part may be considered a download for the purposes of the discussion below.

As shown in FIG. 6, in some examples, the method 600 can be somewhat more "client centric," with more of the authentication and management performed on the "client side" of the system—as indicated by the number of operations on the left side of the chart. In this configuration, much of the communication, authentication, and management, for example, occurs between the APP, the SDK, and the DSS. At 602, the user selects content to be downloaded/watched/listened to later. As mentioned above, this can be done by using an appropriate button (e.g., the aforementioned, "_____ Later" button), by selecting an appropriate menu, or by placing the download in an appropriate queue in the application (e.g., drag-and-drop).

At 604, the application can login to the IAM and retrieve a token to access the DSS. This may involve previous registration of the APP with the DSS, for example, as well as previous registration or enrollment of the user. This can enable the download to be associated with the APP and the user for tracking and billing purposes, among other things. As mentioned above, downloads that utilize the DSS may be provided outside the user's data plan or at reduced or no cost to the user to incentivize users to use the DSS rather than performing instant downloads. In this manner, network utilization is smoothed and total network size requirements are reduced at no cost to the user or the provider.

At 606, the APP communicates with the SDK to register a 0-rated window. At 608, the SDK, in turn, registers (e.g., authenticates) with the DSS with the token previously obtained from the IAM and registers with the DSS for a 0-rated window. In some examples, the SDK may not need an IAM component and/or token authentication and communication can occur directly with the DSS. At 610, the DSS activates the 0-rated window and provides notification of it to the SDK. In some examples, the DSS can provide a registration identification (REGID) to the SDK to identify the download. This essentially places the download in a queue awaiting an available 0-rated download.

If there are a number of APPs already in the queue, the APP may have to wait for several 0-rated windows to open and close to clear the queue. In general, a 0-rated window will open when network utilization falls below a first pre-determined threshold (e.g., 80 or 85%) and remain open for a predetermined amount of time, predetermined amount of data transfer, or until network utilization exceeds a second predetermined threshold (e.g., 85 or 95%). Of course, other factors could also be used such as, for example, time of day, number of users on the network, signal quality, signal strength, or the time the APP has been in queue.

In some examples, the user may be provided with a maximum delay time before the 0-rated download starts (e.g., "your download will start no later than 4 PM"). In some cases, however, network utilization may be such that the 0-rated window may "time-out." In some examples, if the 0-rated download does not occur within the required time, therefore, the system can raise the priority of the download to download sooner or immediately. In some cases, the user may receive a free upgraded download if the 0-rated download times out to provide additional incentive to use the DSS.

Optionally, in some cases, the UE running the APP may change locations, lose connection, or have other download issues. As a result, in some examples, at 612, the SDK may refresh the 0-rated subscription with the DSS with new information (e.g., a new cell tower location). In some example, this can be done with the token previously obtained from the IAM. In other examples, the SDK can obtain a new token and then re-register. At 614, the DSS can reactivate the 0-rated window and inform the SDK of it.

In some cases, prior to starting a download or prior to the download completing, the UE may connect to an alternative, non-cellular network (e.g., a wireless or Ethernet connection). In this case, at 616, the APP can deregister from the 0-rated window with the SDK and download the file over the alternative connection. At 618, the SDK can de-register with the DSS (based on commands from the APP) to remove the download from the 0-rate queue on the DSS. In some cases, if the UE disconnects from the non-cellular connection prior to completion of the download, the system may return to step 612 and reregister the download with the DSS.

At 620, the DSS can notify the SDK that the requested 0-rated window is now available. In other words, the APP has reached the top of the DSS queue and network parameters are such that the download is now ready to download the file. At 622, the SDK can notify the APP that the window is open and to proceed with the download.

At 624, the APP can locate the file to be downloaded on the SRV. In some cases, the file may be in a static location. In this case, the APP may have the location on the SRV based on the user's previous selection of the content. In other cases, the file may be stored dynamically—i.e., the location changes depending on when it is downloaded—and may have to be located on the SRV (or another server) just prior to download. Regardless, the APP can use the previous location or obtain the current location from the SRV prior to download.

At 626, the APP can then request the 0-rated download from the SDK. At 628, the SDK, in turn, can request the 0-rated download from the DSS. At 630, the DSS can install the PCC rule on the PCRF/P-GW. The PCC rule provides the PCRF/P-GW with service data flow (SDF) information that allows identification of the download, charging parameters for the download (if any), and quality-of-service (QoS) parameters to be applied to the download, among other things. In some examples, the PCC rule can be statically configured in a policy charging enforcing function (PCEF—not shown) and then referenced by the PCRF through a Gx interface when needed. See, e.g., FIG. 4.

At 632, the PCRF/P-GW can inform the DSS that the PCC rule has been installed. At 634, the DSS can inform the SDK that the PCC rule has been installed and that the download is ready. At 636, the SDK can inform the APP that the download has been registered and to begin the download. Finally, at 638, the APP requests the download from the SRV.

As shown in FIG. 7, in some examples, the method 700 can still be somewhat "client centric," but with a slightly different progression. In other words, in this configuration, the SRV can be responsible for defining the 0-rated window policy to be utilized by the data shifting service (DSS). This policy can then be transmitted to the APP (i.e., the device to be registered). At 702, the APP can request an authorization token from the SDK. At 704, the SDK can, in turn, request a token from the IAM. At 706, the IAM can provide the authorization token and log the APP onto the network.

After authentication, at 708, the APP can request a delayed download of one or more files from the SRV. At 710, the SRV can provide a notification to the APP that the download has been placed in queue for download at a later time pending authorization from the DSS. At this point, the SRV knows that the user would like to download the content, but does not know when an appropriately rated (e.g., 0-rated) download slot will be available on the network.

At 712, the APP can now register the download with the DSS and can be placed in the DSS queue. As mentioned above, the download may be placed in line with existing 0-rated downloads. In some cases, the queue may span several 0-rated windows as the network utilization varies above and below the predetermined threshold (e.g., 75%) over time. At 714, the DSS can provide a notification to the APP that the download has been registered, at which point the APP awaits notification of an available 0-rated download window.

At 716, the DSS can provide a notification to the SDK that the 0-rated window for the download is now open. At 718, the SDK, in turn, can notify the APP that the window is available. At 720, the APP can again contact the SRV and inform the SRV that the 0-rated window is open and request that the SRV prepare the content for download. At 722, in response, the SRV can provide the PCC rule to the APP outlining the parameters of the download.

The PCC rule can then be propagated from the APP to the SDK, at 724, and from the SDK to the DSS, at 726. At 728, the DSS can request that the PCRF/P-GW install the PCC rule. At 730, the PCRF/P-GW can install the PCC rule and inform the DSS that it has been installed. This information can then be propagated from the DSS to the SDK, at 732, and from the SDK to the APP, at 734. At 736, the APP can send the request to the SRV via the PCRF/P-GW to download the content. Finally, at 738, the PCRF/P-GW can provide the 0-rated window authorization and forward the APP's request of the download from the SRV and the download can begin.

Figure 8A:
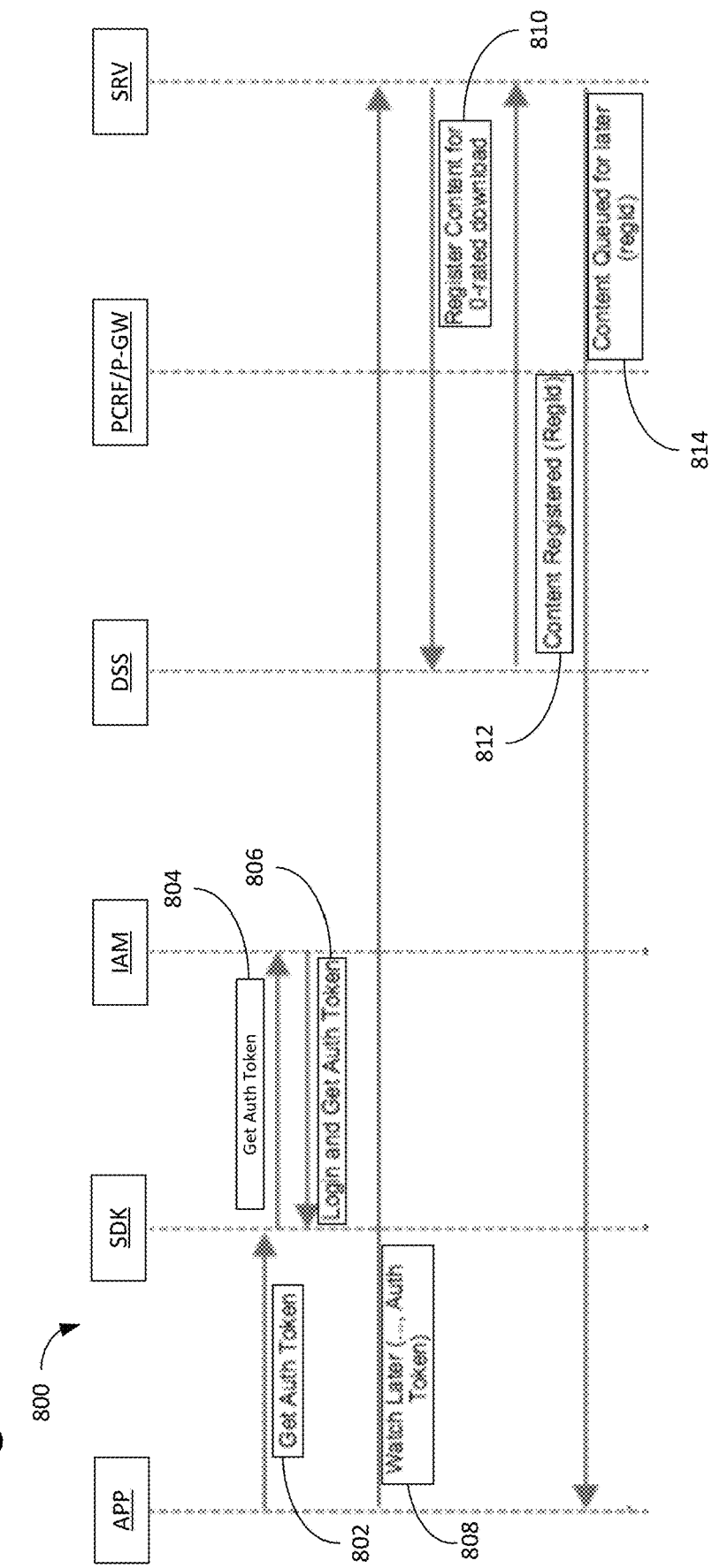
FIGS. 8A and 8B are a system diagram depicting data flow in a cellular network in which the controlling server is responsible for defining and registering the 0-rated window policy to be utilized by the data shifting service (DSS), in accordance with some examples of the present disclosure.

As shown in FIG. 8A, in some examples, the method 800 can be somewhat more "server centric," as indicated by the activity on the right side, or "server side," of the chart. In other words, more of the communication, authentication, and management can take place between the DSS, the PCRF/P-GW, and the SRV, which may represent a more trusted relationship (i.e., rather than relying on the APP or the UE). As before, at 802, the APP can request an authorization token from the SDK. At 804, the SDK can, in turn, request a token from the IAM. At 806, the IAM can provide the authorization token and log the APP onto the network.

After authentication, at 808, the APP can request a delayed download of one or more files from the SRV. In this configuration, however, at 810, the SRV can register the content for a 0-rated download with the DSS (as opposed to the APP in the methods 600, 700, discussed above). At 812, the DSS can notify the SRV that the content has been registered for a 0-rated download. In some examples, the DSS can provide a registration identification (REGID) to the SRV. At 814, the SRV can notify the APP that the download has been registered for later download. In some cases, the SRV can also provide the APP with the REGID. In some examples the APP may be able to provide a user's specific queue and allow the individual customer the ability to manage and configure their own download registrations.

Figure 8B:
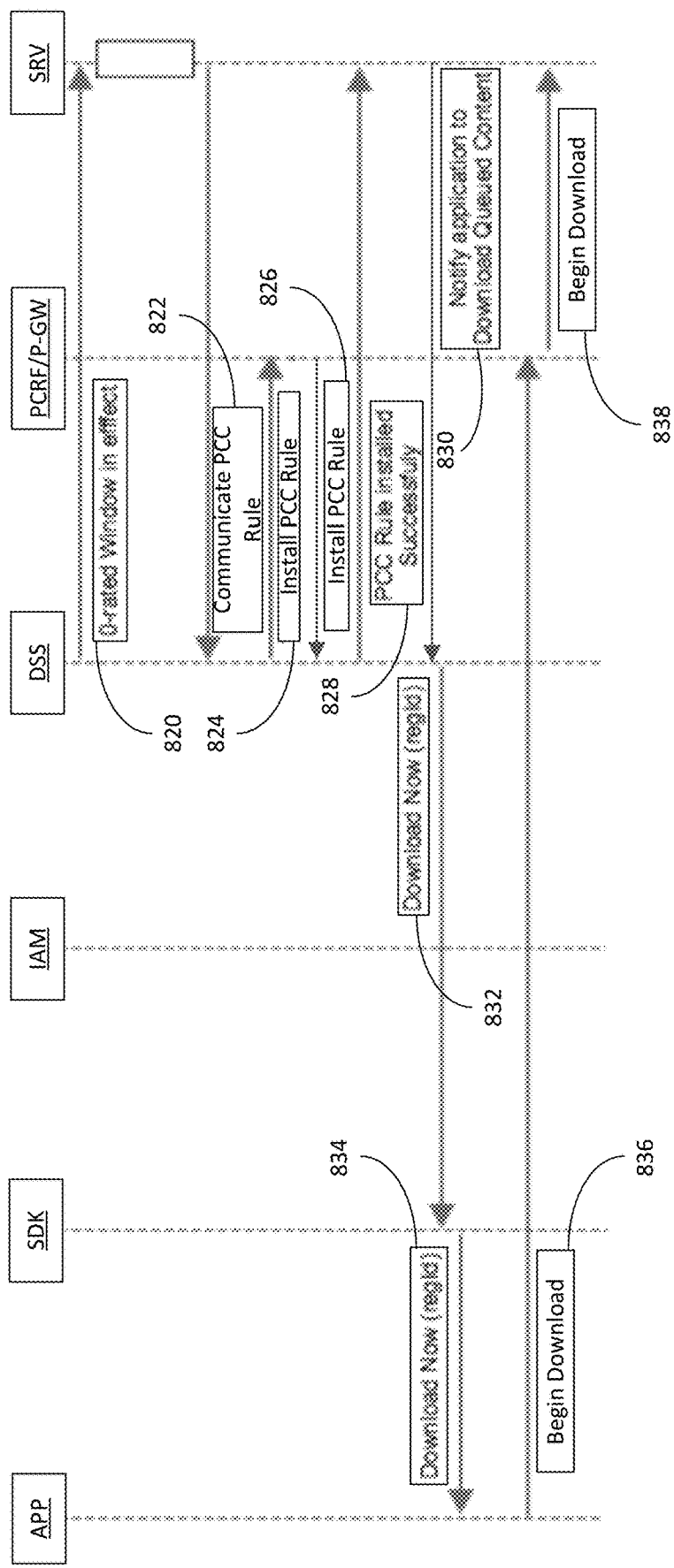

As shown in FIG. 8B, at 820, the DSS can notify the SRV that the 0-rated download window for the download is open. At 822, this prompts the SRV to provide the PCC rule to the DSS for the download. At 824, the DSS can then provide the PCC rule to the PCRF/P-GW and, at 826, receive a notification from the PCRF/P-GW that the PCC rule has been installed. Finally, at 828, the DSS can notify the SRV that the PCC has been installed on the PCRF/P-GW.

At 830, the DSS can send a notification to the SDK that the download (e.g., the download associated with the REGID) is ready for download. At 832, the SDK can inform the APP of it. At 834, the APP can request the download from the SRV via the PCRF/P-GW. At 836, the PCRF/P-GW can verify the 0-rated window and forward the APP request to the SRV to begin downloading the content to the APP.

Regardless of the method used, in some cases, the download may start, but then be interrupted. This may be because the UE moves from one cell tower to another, for example, because the UE loses reception (e.g., enters a tunnel), or because the UE connects to a new network. If the download does not complete, in some examples, the APP can delete the portion of the download that was started and re-register for a new download slot.

In other examples, the APP can include a resume feature, which saves the portion of the download that was completed before disconnection, but then registers for a new download for the remainder of the download. If, as discussed above, the APP is downloading a 500 MB part of a movie, for example, but the download is interrupted at 400 MB, the APP can save the 400 MB portion of the download and then register for a separate download of the remaining 100 MB. When all parts of the movie are downloaded, the APP can assemble the parts into the complete 4 GB movie.

In other examples, the decision as to whether to keep a portion of the download or discard it may be based on how much of the download completed prior to disconnection. In other words, if the APP is downloading a 500 MB part of a movie and the download disconnects after a relatively small portion of the download has completed (e.g., 40 MB), the APP may choose to discard the downloaded portion and then re-register the complete 500 MB as a new download. If, on the other hand, a relatively large portion of the download has completed (e.g., 400 MB), then the APP may keep the portion that has completed and re-register to download the remainder of the download (e.g., the remaining 100 MB).

In some cases, the APP can contain a decision tree that includes keeping or discarding the failed download based on the percentage of the download that was completed prior to disconnection. If, for example, a predetermined percentage of the download was completed prior to disconnection (e.g., between 15-95% of the download), then the APP can save the portion that was downloaded and re-register to download the remaining portion. If the predetermined percentage is 50%, for example, then the APP can save the downloaded portion only when more than 50% of the download completed prior to disconnection. The percentage can be fixed or can be variable depending on various UE and network factors. UEs or networks with higher maximum download speeds, for example, may be more suitable for the system to discard incomplete downloads, for example. If a particular UE or cell tower generally has relatively low connection quality making downloading difficult, on the other hand, the system may be more prone to keep and resume partial downloads.

As discussed above, users can be incentivized to use the system by offering free or discounted data rates. In some examples, the provider may offer time-shifted downloads to users that are not counted against the user's monthly data plan. In this manner, the user is incentivized to use a system that increases average network utilization and reduces maximum network utilization. Increasing network utilization from 80% to 90%, for example, costs the provider nothing (or substantially nothing). Increasing the maximum data capacity of the network to account for spikes in data usage, on the other hand, can result in substantial capital investments. As a result, offering free off-peak downloads is a "win-win" for the user and the cellular network provider, respectively.

In some examples, cellular providers can also partner with content providers to provide the "download later" feature. In some examples, this feature may be offered free to the content providers merely to provide their users with alternative downloading schemes. In other examples, content providers may be given incentives to offer this feature such as, for example, preferential placement in search results, discounted data rates, or free/discounted/shared advertising. This can enable the provider to shift large amounts of data to off-peak download slots and substantially smooth network utilization rates. Indeed, if network utilization rates can be smoothed substantially, network capacity can be reduced substantially, saving infrastructure and operating costs.

While several possible examples are disclosed above, examples of the present disclosure are not so limited. For instance, while systems and methods for use with cellular phone systems has been disclosed, other systems or subsystems could be utilized in a similar manner without departing from the spirit of the disclosure. In addition, while generally referred to above as "downloads," the system can be used for many types of data transfer over networks, regardless of their content or purpose. Finally, the order of steps in many of the methods discussed herein could be changed without significantly affecting the functionality of the disclosure. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

The invention claimed is:
1. A method comprising:
 receiving, by an application executing on a user equipment (UE), an indication of a user selection to perform a download of a data file from a content provider server on a delayed basis;

sending, by the application to a data shifting service (DSS), a request to register the download with the DSS as a 0-rated download that is subject to being performed when a utilization parameter of a cellular network is below a predetermined threshold associated with a lowest download priority on the cellular network;

receiving, by the application from the DSS, a first notification indicating that the 0-rated download has been registered with the DSS;

refraining, by the application, from downloading the data file until the application receives a second notification from the DSS indicating that a 0-rated download window is available; and downloading, by the application to the UE, at least a portion of the data file via the cellular network during the 0-rated download window in response to receiving the second notification.

2. The method of claim 1, wherein the second notification indicates that the DSS has determined that the 0-rated download window is available based on the utilization parameter of the cellular network being below the predetermined threshold.

3. The method of claim 1, wherein downloading the at least the portion of the data file comprises sending, by the application, a second request to the content provider server that requests the data file.

4. The method of claim 1, further comprising:
determining, by the application, that an alternative connection different from the cellular network is available to the UE;
sending, by the application to the DSS, a second request to deregister the 0-rated download with the DSS; and
continuing, by the application, the downloading over the alternative connection.

5. The method of claim 4, further comprising:
determining, by the application, that the alternative connection has become unavailable;
sending, by the application to the DSS, a third request to re-register the 0-rated download with the DSS; and
ceasing, by the application, the downloading until the DSS informs the application that a second 0-rated download window is available.

6. The method of claim 1, wherein the application receives the indication of the user selection based on an activation of a user interface element displayed at the UE by the application in association with the data file.

7. The method of claim 1, wherein the 0-rated download window is time-based and allows the downloading to occur during a period of time following an opening of the 0-rated download window.

8. The method of claim 1, wherein the 0-rated download window is size-based and allows the at least the portion of the data file up to a particular size to be transferred during the downloading.

9. The method of claim 1, further comprising combining, by the application, a plurality of parts of the data file downloaded during the 0-rated download window and one or more other 0-rated download windows.

10. The method of claim 1, further comprising:
re-registering, by the application, the 0-rated download with the DSS upon an interruption of the downloading during the 0-rated download window; and
determining, by the application, whether to discard the at least the portion of the data file downloaded during the 0-rated download window to retry downloading the data file entirely during one or more subsequent 0-rated download windows or to save the at least the portion of the data file downloaded during the 0-rated download window to continue downloading a remainder of the data file during the one or more subsequent 0-rated download windows.

11. A user equipment (UE), comprising:
one or more processors;
a communication interface; and
memory storing computer-executable instructions that, when executed by the one or more processors, cause the UE to perform operations comprising:
receiving an indication of a user selection to perform a download of a data file from a content provider server on a delayed basis;
sending, to a data shifting service (DSS), a request to register the download with the DSS as a 0-rated download that is subject to being performed when a utilization parameter of a cellular network is below a predetermined threshold associated with a lowest download priority on the cellular network;
receiving, from the DSS, a first notification indicating that the 0-rated download has been registered with the DSS;
refraining from downloading the data file until a second notification is received from the DSS indicating that a 0-rated download window is available; and
downloading at least a portion of the data file via the cellular network during the 0-rated download window in response to receiving the second notification.

12. The UE of claim 11, wherein the 0-rated download window is time-based and allows the downloading to occur during a period of time following an opening of the 0-rated download window.

13. The UE of claim 11, wherein the 0-rated download window is size-based and allows the at least the portion of the data file up to a particular size to be transferred during the downloading.

14. The UE of claim 11, wherein the operations further comprise:
determining that an alternative connection different from the cellular network is available to the UE;
sending, to the DSS, a second request to deregister the 0-rated download with the DSS; and
continuing the downloading over the alternative connection.

15. The UE of claim 11, wherein the indication of the user selection is received based on an activation of a user interface element displayed by the UE in association with the data file.

16. The UE of claim 11, wherein the second notification indicates that the DSS has determined that the 0-rated download window is available based on the utilization parameter of the cellular network being below the predetermined threshold.

17. One or more non-transitory computer-readable media storing computer-executable instructions that, when executed by one or more processors associated with user equipment (UE), cause the UE to perform operations comprising:
receiving an indication of a user selection to perform a download of a data file from a content provider server on a delayed basis;
sending, to a data shifting service (DSS), a request to register the 0-rated download with the DSS as a 0-rated download that is subject to being performed when a utilization parameter of a cellular network is below a predetermined threshold associated with a lowest download priority on the cellular network;

receiving, from the DSS, a first notification indicating that the 0-rated download has been registered with the DSS;

refraining from downloading the data file until a second notification is received from the DSS indicating that a 0-rated download window is available; and downloading at least a portion of the data file via the cellular network during the 0-rated download window in response to receiving the second notification.

18. The one or more non-transitory computer-readable media of claim 17, wherein the 0-rated download window is time-based and allows the downloading to occur during a period of time following an opening of the 0-rated download window, or is size-based and allows the at least the portion of the data file up to a particular size to be transferred during the downloading.

19. The one or more non-transitory computer-readable media of claim 17, wherein the operations further comprise:
determining that an alternative connection different from the cellular network is available to the UE;
sending, to the DSS, a second request to deregister the 0-rated download with the DSS; and
continuing the downloading over the alternative connection.

20. The one or more non-transitory computer-readable media of claim 17, wherein the indication of the user selection is received based on an activation of a user interface element displayed in association with the data file.

* * * * *